(12) United States Patent
Quix et al.

(10) Patent No.: US 11,549,428 B2
(45) Date of Patent: Jan. 10, 2023

(54) ADVANCED THERMOSTAT SYSTEM FOR AN INTERNAL COMBUSTION ENGINE WITH BOOST PRESSURE DEPENDING CONTROL FUNCTION

(71) Applicant: Ford Global Technologies, LLC, Dearborn, MI (US)

(72) Inventors: Hans Guenter Quix, Herzogenrath (DE); Jan Mehring, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/443,234

(22) Filed: Jul. 22, 2021

(65) Prior Publication Data
US 2022/0034254 A1   Feb. 3, 2022

(30) Foreign Application Priority Data
Jul. 29, 2020   (DE) .......................... 102020209518.3

(51) Int. Cl.
*F01P 7/16*   (2006.01)
*F01P 7/14*   (2006.01)

(52) U.S. Cl.
CPC .......... *F01P 7/16* (2013.01); *F01P 2007/146* (2013.01); *F01P 2025/04* (2013.01); *F01P 2025/08* (2013.01); *F01P 2060/12* (2013.01); *F01P 2070/06* (2013.01)

(58) Field of Classification Search
CPC .... F01P 7/16; F01P 2007/146; F01P 2025/04; F01P 2025/08; F01P 2060/12; F01P 2070/06
See application file for complete search history.

(56) References Cited

U.S. PATENT DOCUMENTS

| | | | |
|---|---|---|---|
| 5,404,842 A * | 4/1995 | Matsushiro | F01P 7/167 123/41.1 |
| 2019/0353087 A1* | 11/2019 | Quix | F16K 49/005 |
| 2020/0158003 A1* | 5/2020 | Quix | F02B 29/0456 |

FOREIGN PATENT DOCUMENTS

| | | |
|---|---|---|
| DE | 102005004778 A1 | 8/2005 |
| GB | 2086536 A | 5/1982 |

* cited by examiner

*Primary Examiner* — Jacob M Amick
(74) *Attorney, Agent, or Firm* — Vincent Mastrogiacomo; McCoy Russell LLP

(57) ABSTRACT

Methods and systems are provided for a valve for controlling the flow of a fluid medium in a coolant circuit of an internal combustion engine. The valve is configured to react to the temperature of the coolant via an expansion element and to the charge pressure in the intake tract via a pressure-sensitive actuator.

20 Claims, 11 Drawing Sheets

ADVANCED THERMOSTAT SYSTEM FOR AN INTERNAL COMBUSTION ENGINE WITH BOOST PRESSURE DEPENDING CONTROL FUNCTION

CROSS REFERENCE TO RELATED APPLICATIONS

The present application claims priority to German Patent Application No. 102020209518.3 filed on Jul. 29, 2020. The entire contents of the above-listed application is hereby incorporated by reference for all purposes.

FIELD

The present description relates a temperature- and pressure-dependent thermostat valve for controlling a coolant flow, to an arrangement having the thermostat valve, and to a motor vehicle having the arrangement.

BACKGROUND/SUMMARY

Reduction in carbon dioxide emissions may be desired for current and future technology of internal combustion engines. For example, various methods for counteracting carbon dioxide emissions through reduction of the internal friction in the engine have been developed. One example method may include not allowing the internal combustion engine to cool down beyond a threshold temperature during low loads by controlling the temperature of the coolant of the internal combustion engine. Compared with high loads, high cooling may not be desired at low loads, and the settings of the combustion parameters (for example, a knocking limit) may permit relatively high internal combustion engine temperature. A thermostat or controllable valve in a coolant circuit may be used to control a temperature of the coolant. Previous examples of thermostats may be inexpensive and relatively robust. However, a reaction time of previously designed thermostats may be delayed. By contrast, controllable valves may react quickly, but demand a complex control strategy; moreover, complex mechanisms may be needed to counteract overheating of the internal combustion engine in the event of degradations. It is therefore the object to control the cooling of an internal combustion engine in a quick and reliable manner that overcome the issues described above with thermostats and controllable valves.

In one example, the issues described above may be at least partially solved by a valve for controlling the flow of a fluid medium in a coolant circuit of an internal combustion engine which can be supercharged, having an expansion element which is operatively connected to a transmission pin of the valve in order to control the flow of the fluid medium through the valve by way of a change in volume which is dependent on the temperature of the fluid medium. The thermostat valve furthermore has an actuator which can be regulated by pressure and which is additionally operatively connected to the transmission pin of the valve in order to control the flow of the fluid medium through the valve.

The valve according to the present disclosure may include a combination of an expansion element with a pressure-sensitive actuator, which may allow controllable, quick, and robust control of the temperature of a coolant in a coolant circuit. The influence of the pressure may allow the valve to be opened at different coolant temperatures. The valve may simply and efficiently control of the coolant temperature.

The pressure-sensitive actuator may be connected to variable-pressure surroundings via a connecting line. In this way, a pressure generated by a compressor arranged in the intake tract (charge pressure) may be transmitted to the actuator. Here, a high charge pressure, which correlates with a high load of the internal combustion engine, effects a movement of the transmission pin and thus a lower opening temperature of the thermostat valve with respect to the cooler. Thus, at high loads, the thermostat valve according to the disclosure allows a lower opening temperature of the valve with respect to the heat exchanger than previous examples of valves. Thus, at the commencement of high loading, heat may be dissipated from the internal combustion engine at an early stage.

The expansion element may comprise wax. In a threshold temperature range, the wax melts and in the process undergoes a change in volume, that is to say the volume of the expansion element is increased. The expansion element therefore assumes the temperature of the coolant and changes its volume in a manner dependent on the temperature, whereby said expansion element acts on the transmission pin of the valve. In some example, the expansion element may be any other suitable element other than wax.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
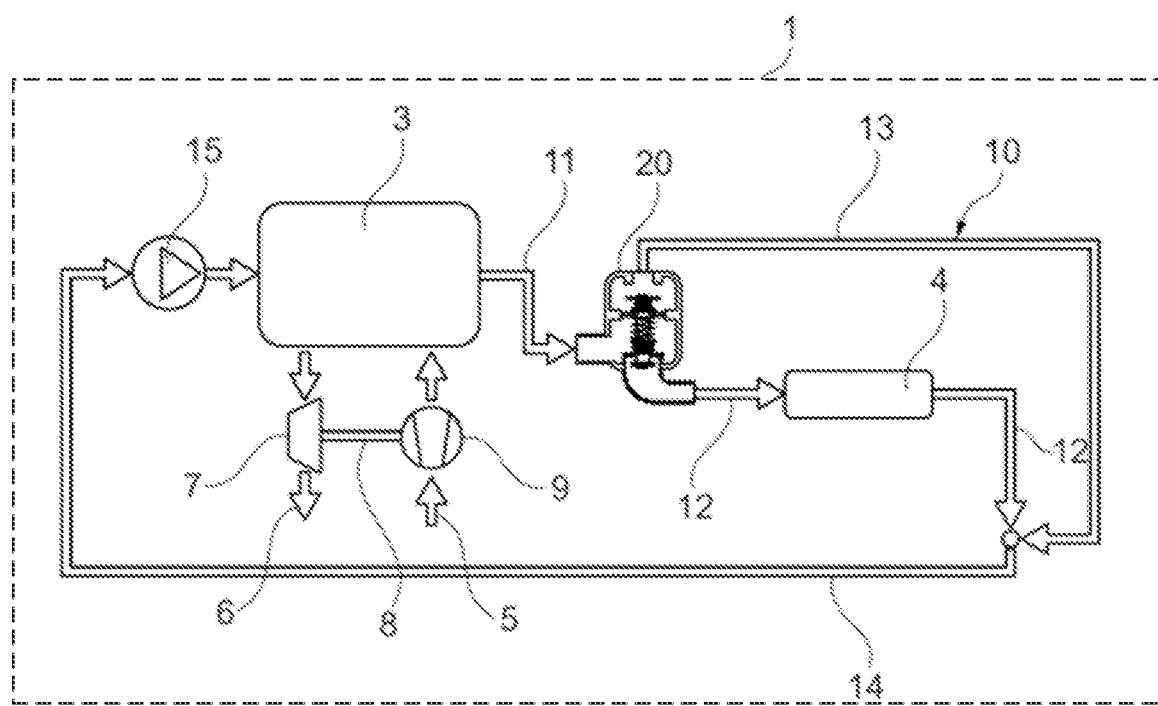
FIG. 1 shows a schematic illustration of a conventional arrangement.
Figure 2:
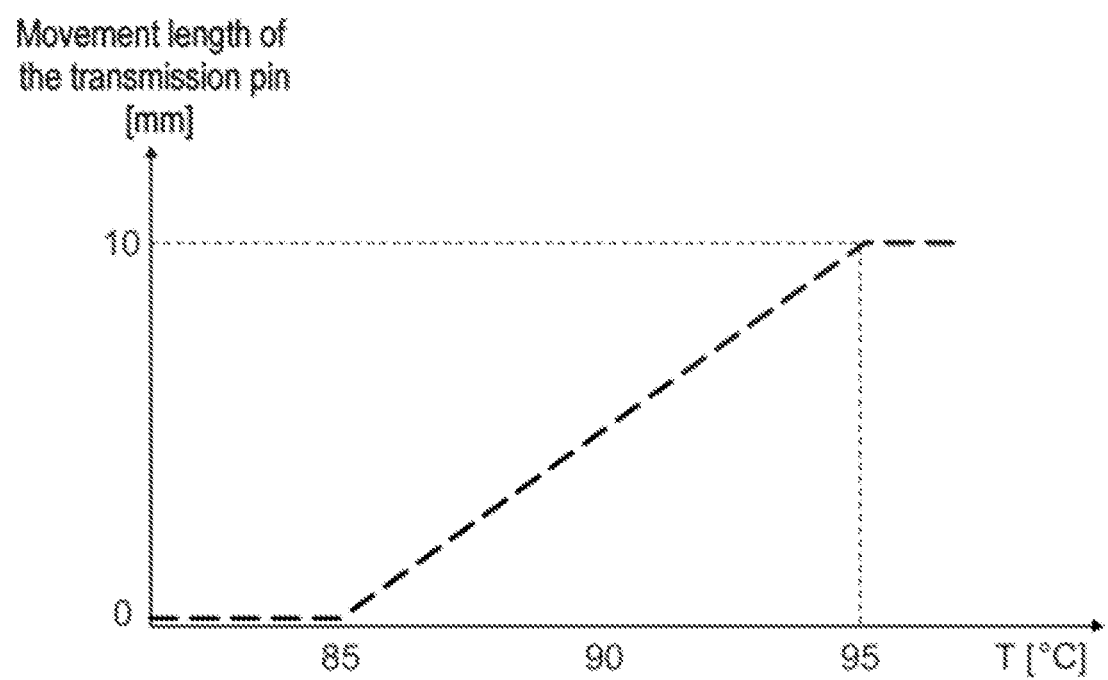
FIG. 2 shows a diagram for the movement characteristic of the transmission pin of a previous example of a thermostat valve.
Figure 3:
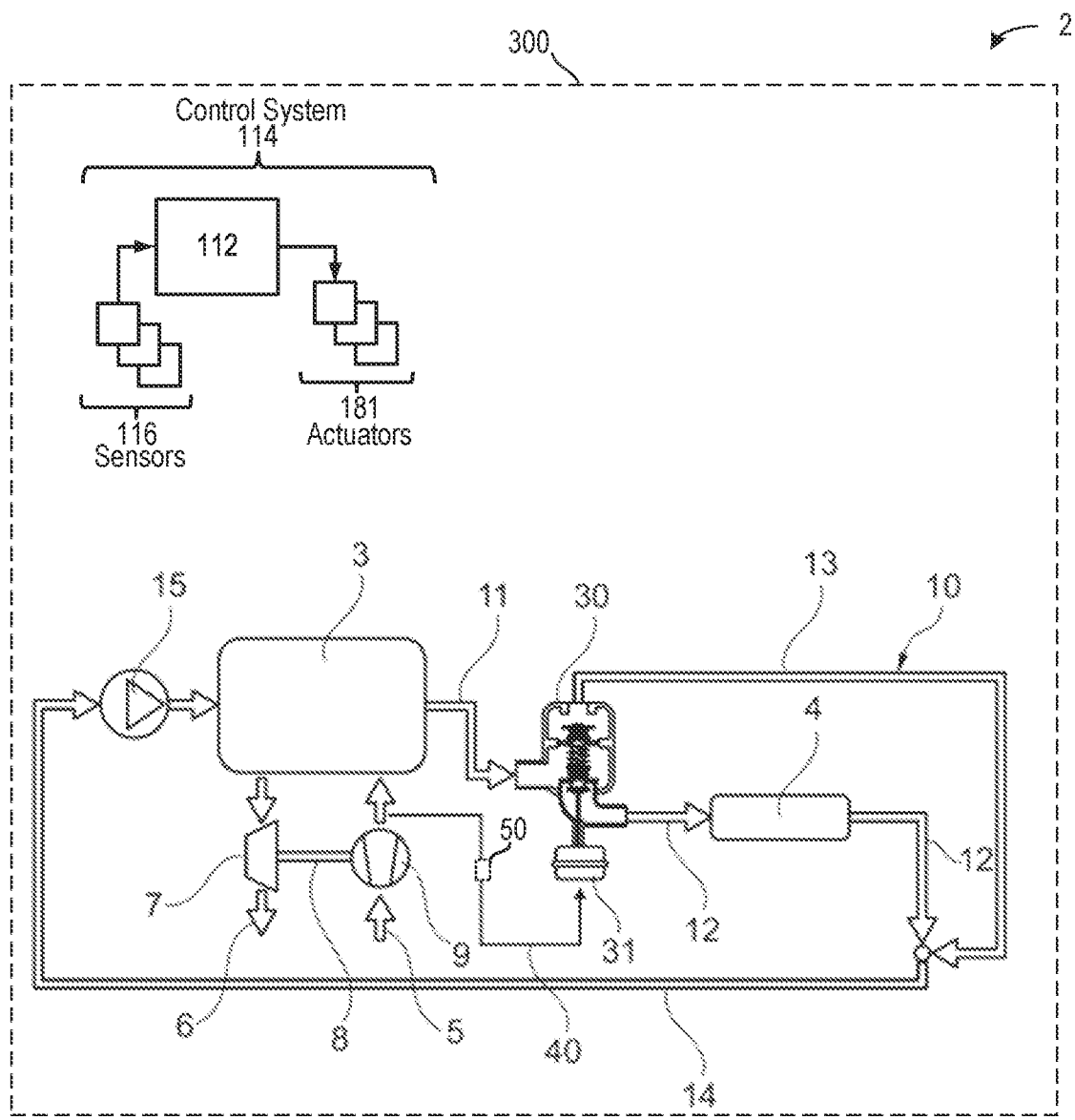
FIG. 3 shows a schematic illustration of an arrangement according to the disclosure.
Figure 4:
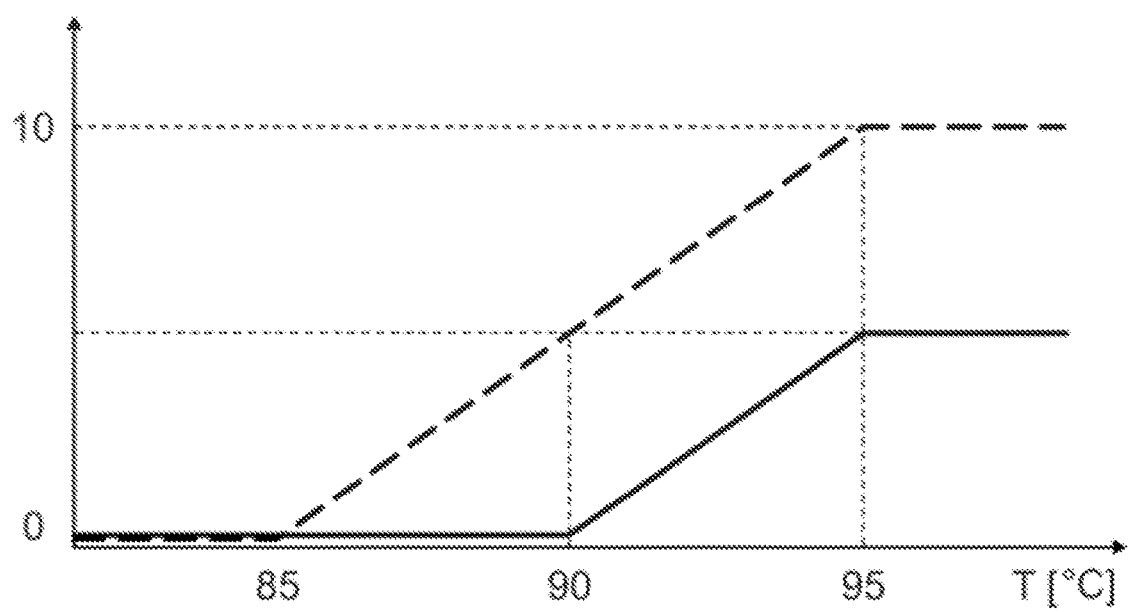
FIG. 4 shows a diagram for the opening characteristic of the valve according to the disclosure.
Figure 5:
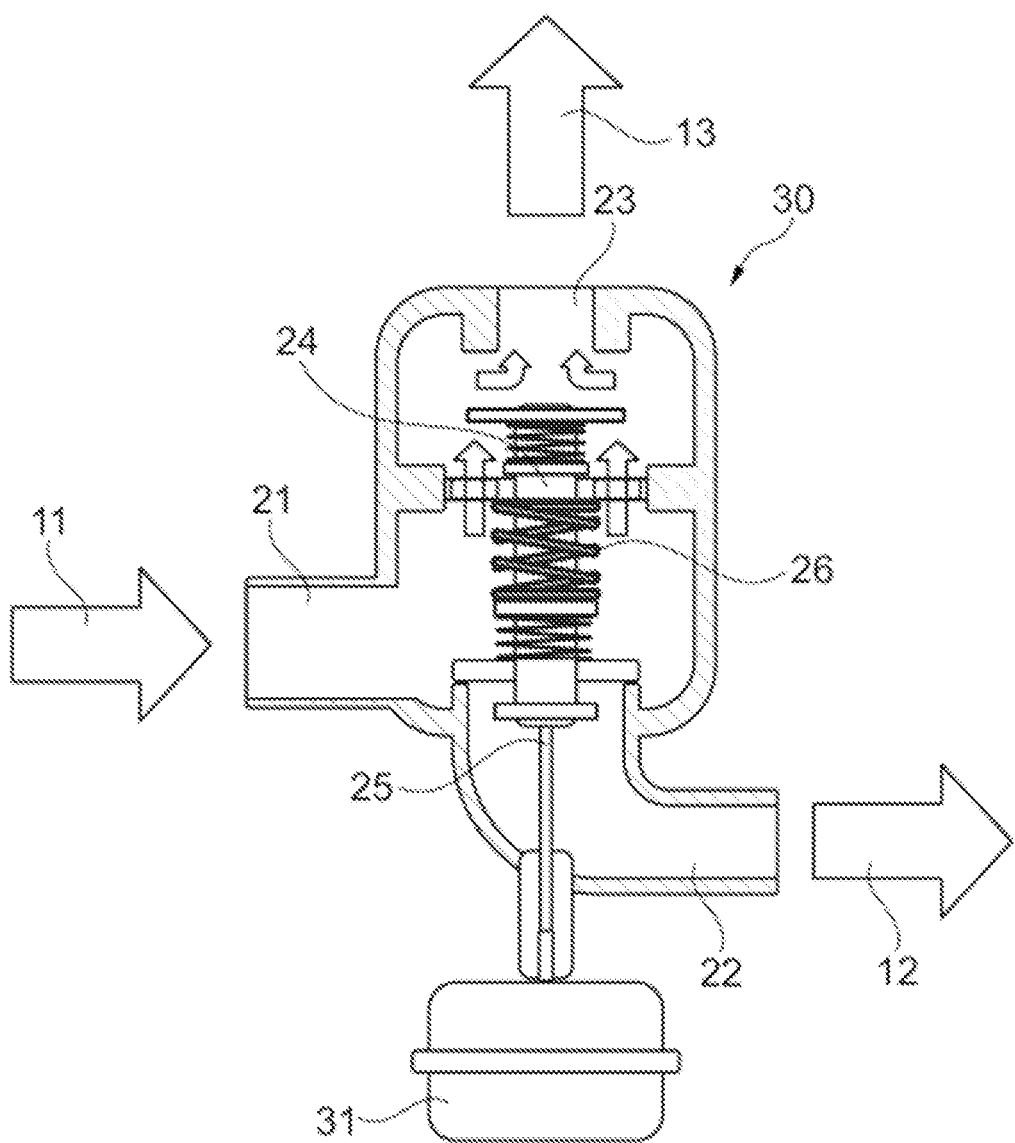
FIG. 5 shows a sectional illustration of an embodiment of the valve according to the disclosure in a first working state.
Figure 6:
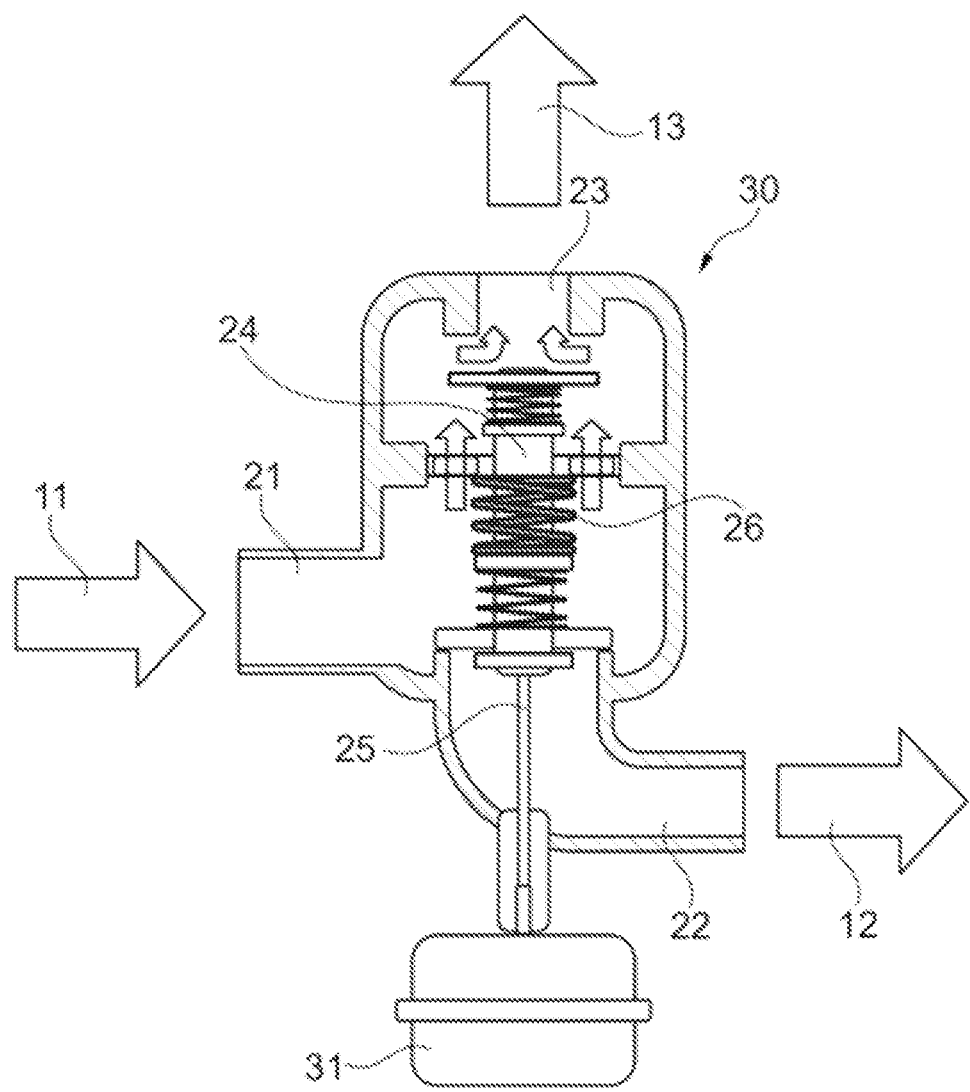
FIG. 6 shows the valve as per FIG. 5 in a further working state.
Figure 7:
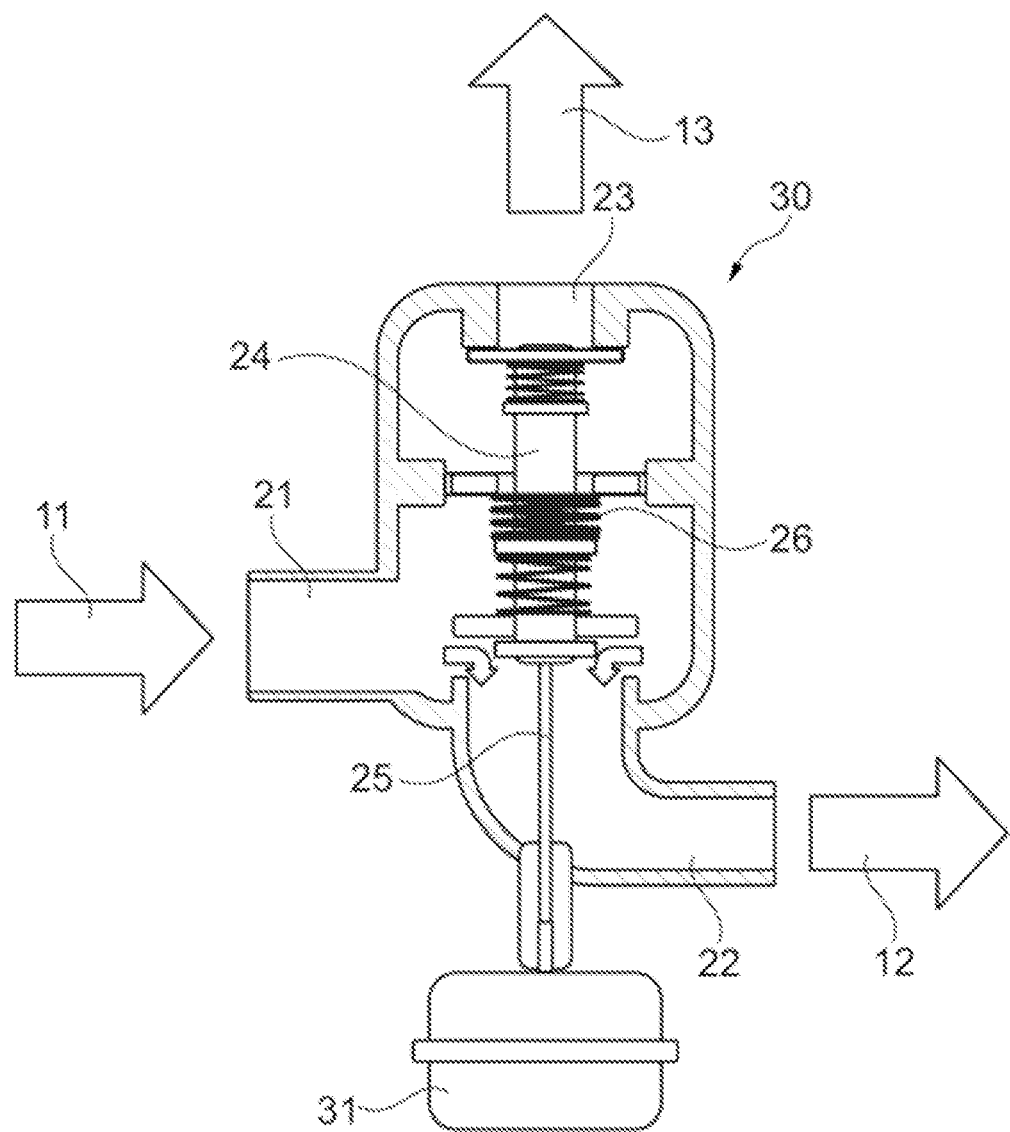
FIG. 7 shows the valve as per FIG. 5 in a further working state.
Figure 8:
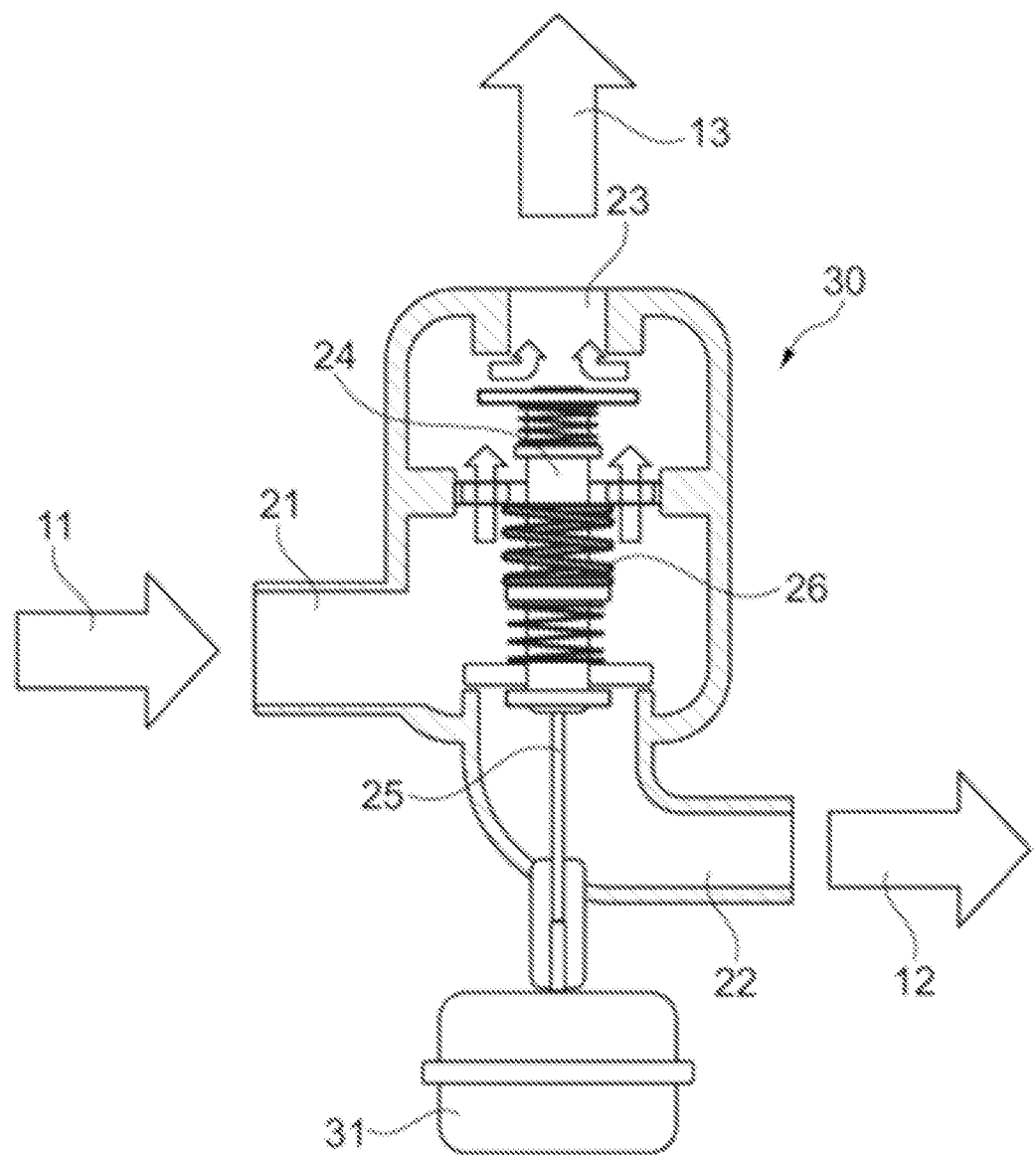
FIG. 8 shows the valve as per FIG. 5 in a further working state.
Figure 9:
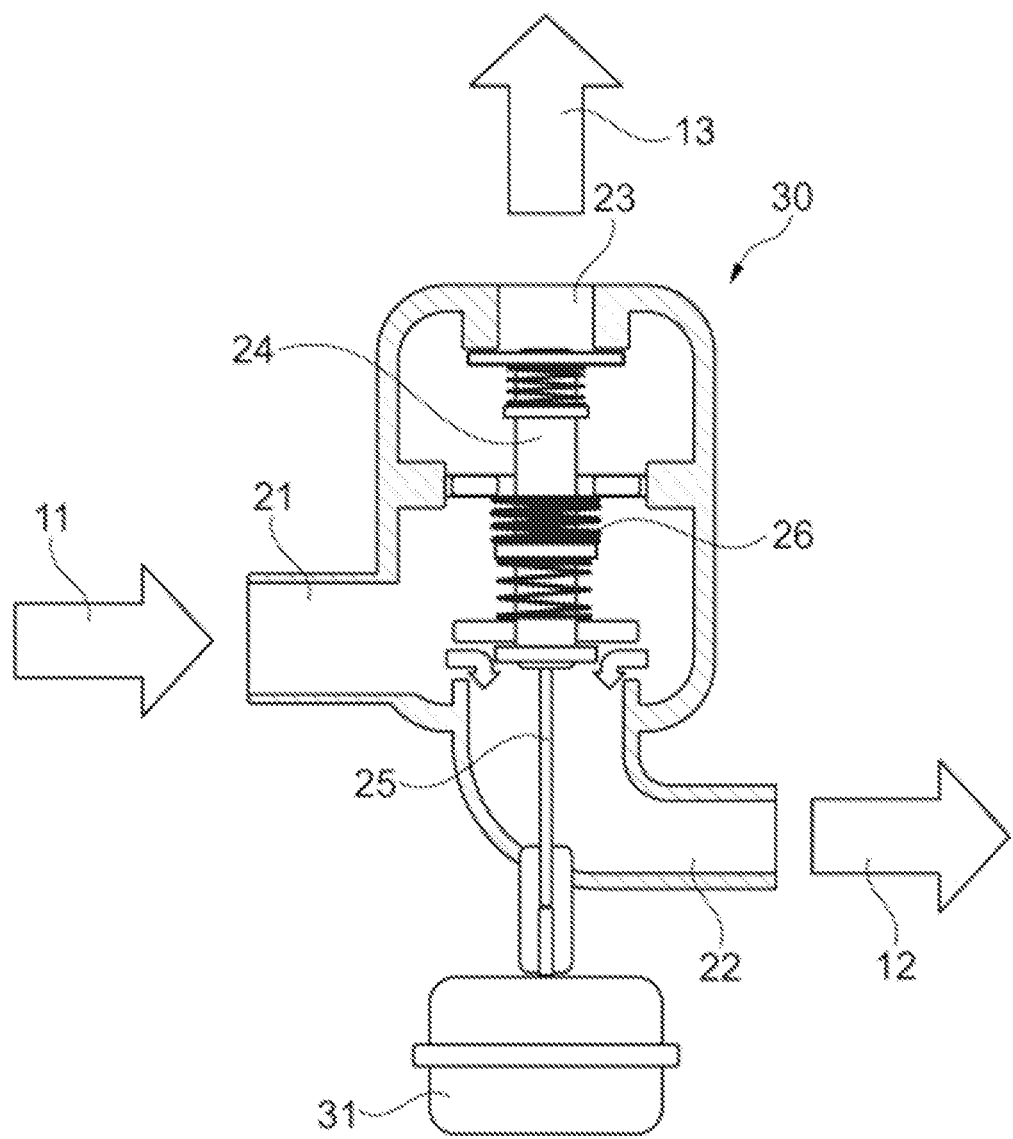
FIG. 9 shows the valve as per FIG. 5 in a further working state.
Figure 10:
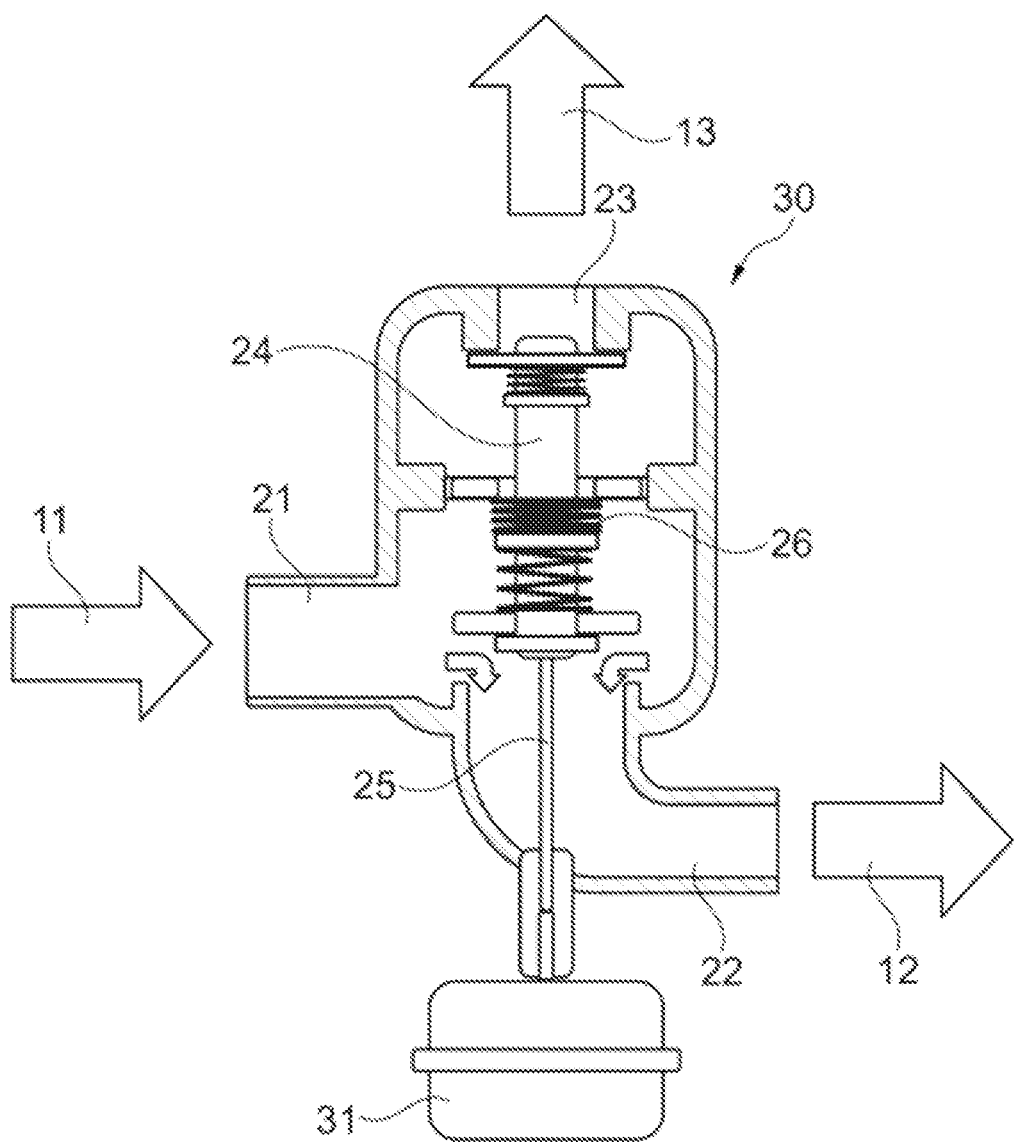
FIG. 10 shows the valve as per FIG. 5 in a further working state.
Figure 11:
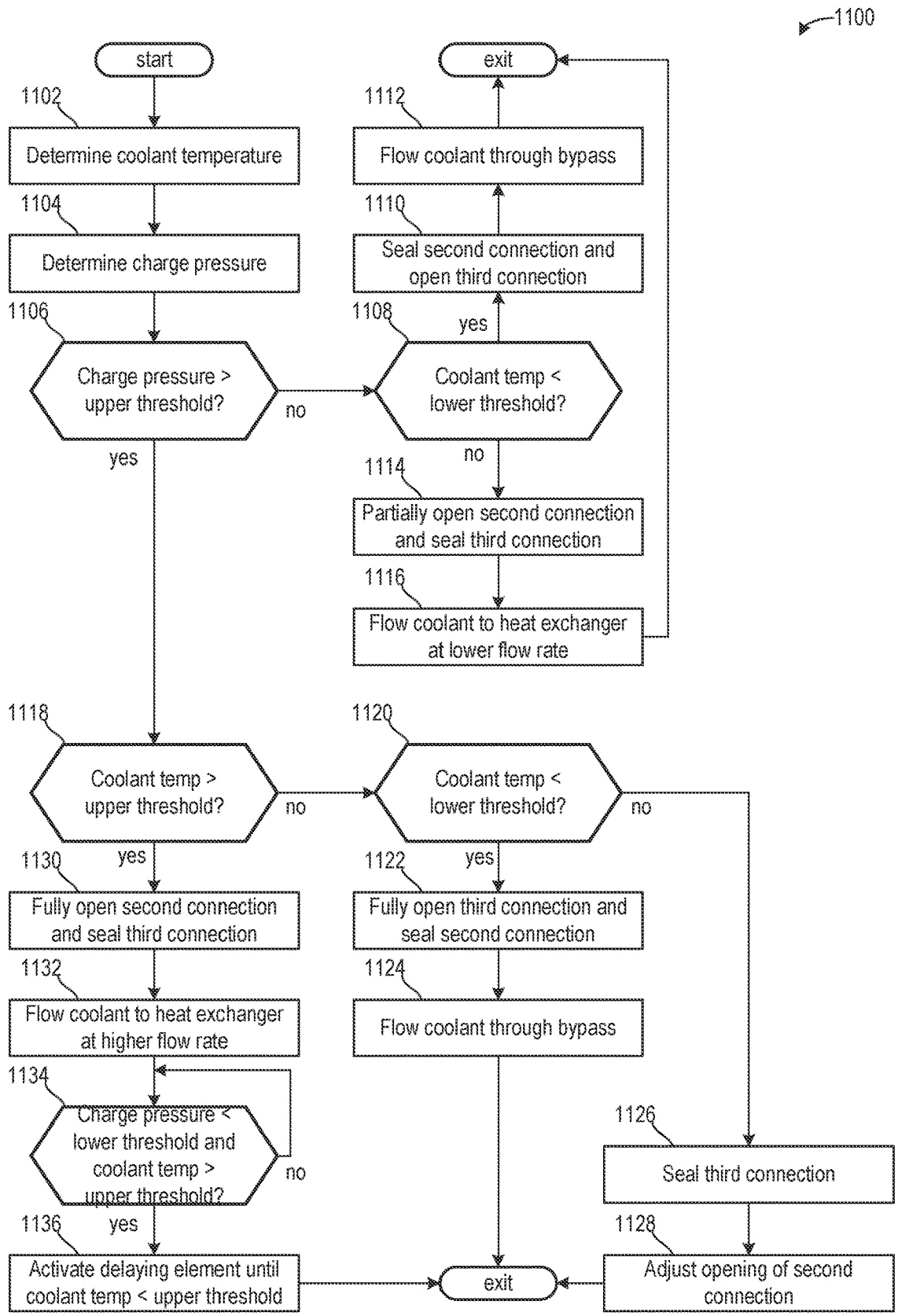
FIG. 11 shows a method for operating the valve.

The following description relates to systems and methods for a coolant valve. FIG. 1 shows a schematic illustration of a conventional arrangement. FIG. 2 shows a diagram for the movement characteristic of the transmission pin of a conventional thermostat valve. FIG. 3 shows a schematic illustration of an arrangement according to the disclosure. FIG. 4 shows a diagram for the opening characteristic of the thermostat valve according to the disclosure. FIG. 5 shows a sectional illustration of an embodiment of the valve according to the invention in a first working state. FIG. 6 shows the valve as per FIG. 5 in a further working state. FIG. 7 shows the valve as per FIG. 5 in a further working state. FIG. 8 shows the valve as per FIG. 5 in a further working state. FIG. 9 shows the valve as per FIG. 5 in a further working state. FIG. 10 shows the valve as per FIG. 5 in a further working state. FIG. 11 shows a method for operating the valve.

In one example, the thermostat valve according to the disclosure has at least one first connection, at least one second connection and at least one third connection, wherein the respective opening state and degree of opening of the second and third connection can be controlled in a manner dependent on the coolant temperature and on the pressure acting on the actuator. In other words, the second and the third connection can particularly be considered as valve openings which may be opened and closed by way of the action of coolant temperature and charge pressure. Within the context of the disclosure, the thermostat valve may be coupled to a coolant circuit via a first coolant line via the first connection, to a second coolant line via the second connection, and to a third coolant line via the third connection. In one example, the first coolant line is a feeding line, and the second coolant line and the third coolant line are carrying-away lines.

In some examples, additionally or alternatively, the thermostat valve according to the disclosure has at least one damping element which is configured to delay the movement of the transmission pin. The damping element may be desired since it consequently does not change the changed opening temperature every time there is a momentary change in the charge pressure. Furthermore, a coolant flow to the cooler beyond the time of the elevated charge pressure is possible, and consequently relatively cool coolant is provided for a time during which, although the load is reduced, high temperatures of the internal combustion engine still prevail.

In some examples, additionally or alternatively, in the thermostat valve according to the disclosure, in a first working state, the second connection is closed and the third connection is open, in a second working state, the second connection is at least partially open and the third connection is closed, and, in a third working state, the second connection is fully open and the third connection is closed. Here, the first connection may be open at all times, in one example.

A second aspect of the disclosure relates to an arrangement of an internal combustion engine, having an intake tract and an exhaust tract, wherein a compressor is arranged in the intake tract, and having a coolant circuit with at least one first, second, and third coolant line, which has a thermostat valve according to the disclosure. Here, the advantages of the arrangement correspond to those of the thermostat valve. The compressor may be a for example a compressor of a turbocharger or a compressor driven electrically or mechanically in some other way.

In some examples, additionally or alternatively, in the arrangement according to the disclosure, the pressure-sensitive actuator of the thermostat valve is connected to the intake tract of the internal combustion engine downstream of the compressor via a connecting line. This arrangement allows transmission of the pressure from the intake tract to the actuator, which, at sufficiently high pressure, can actuate the valve.

In some examples, additionally or alternatively, in the arrangement according to the disclosure, the first coolant line is connected to the cooling jacket of the internal combustion engine, the second coolant line is connected to a heat exchanger, and the third coolant line is the bypass line of the heat exchanger.

Herein, the term load refers to the ratio of rotational speed to torque. Here, it is clear to a person skilled in the art when a high load (full load) or a relatively low load (part load) is present at a particular internal combustion engine.

Turning now to FIG. 1, it shows a vehicle 1 including an internal combustion engine 3 with a coolant circuit 10, coolant is conducted from the internal combustion engine 3 to a heat exchanger 4. Here, the internal combustion engine 3 is normally surrounded at least partially by a cooling jacket, in which the coolant flows and absorbs and dissipates heat from the internal combustion engine 3. In the heat exchanger 4, which may also be referred to as cooler, the heat is transferred from the coolant to the surroundings or to another heat carrier. The coolant may include water or a water-glycol mixture.

The internal combustion engine 3 may be connected to an intake tract 5 for feeding of combustion air and to an exhaust tract 6 for discharge of exhaust gas. There is arranged in the exhaust tract 6 a turbine 7, and in the intake tract 5 a compressor 9, of an exhaust-gas turbocharger, which compressor is connected to the turbine 7 via a shaft 8.

A thermostat valve 20 may be arranged in the coolant circuit 10 and configured to adjust a coolant flow in response to a coolant temperature. In the coolant circuit 10, a first coolant line 11 leads from the internal combustion engine 3 to the thermostat valve 20. The thermostat valve 20 is configured to conduct the coolant based on the coolant temperature through a second coolant line 12, in which the heat exchanger 4 is arranged, or through a third coolant line 13, which is provided as a bypass line of the heat exchanger 4 when the coolant temperature. Downstream of the heat exchanger 4, the second coolant line and the third coolant line are combined to form a fourth coolant line 14. A coolant pump 15 is arranged in the fourth coolant line and is provided for conducting coolant flow in the coolant circuit 10.

The thermostat valve may include a first connection for the first coolant line, a second connection for the second coolant line, and a third connection for the third coolant line. The thermostat valve may include an expansion element, which may mimic a temperature sensor. The expansion element detects the temperature of the coolant which comes from the internal combustion engine. The expansion element may include wax as an expansion material in a housing. A significant change in volume of the wax occurs in the range of approximately 85-95° C. due to a phase transition. The change in volume is converted into a movement of a transmission pin, whereby the respective opening status of the second connection and of the third connection are controlled. Cooling again of the wax results in the transmission pin being pushed back into its starting position, for example by a spring mechanism.

The dependence of the movement of the transmission pin on the temperature of the coolant is illustrated in the diagram in FIG. 2. Up to a temperature of 85° C., the expansion element has its smallest extent. The transmission pin is in a starting position (0 mm). At 85° C., the expansion element begins to expand. Up to a temperature of 95° C., there is a linear dependence between the temperature and the movement of the transmission pin 25. At 95° C., the maximum movement of the transmission pin has been attained (10 mm). This may describe an operation of a previous example of a thermostat valve. The time needed for the expansion element to phase change (e.g., melt) may be relatively high, which may reduce efficiency of the coolant to control an engine temperature.

An embodiment 2 of the vehicle 300 is shown in FIG. 3, which may be similar to the vehicle 1 of FIG. 1, except that the vehicle 300 includes a thermostat valve 30 according to the disclosure. By contrast to the previous example of thermostat valve 20 in FIG. 1, a valve 30 according to the disclosure additionally has a pressure-sensitive actuator 31. The pressure-sensitive actuator 31 is configured to react to differences in pressure and, in the case of elevated pressure, to effect a movement of the transmission pin 25.

The arrangement shown in FIG. 3 furthermore includes a connecting line 40 from the intake tract 6 to the actuator 31. The connecting line 40 branches off from the intake tract 6 downstream of the compressor 9, with the result that the pressure conditions upstream of the internal combustion engine 3 can be transmitted to the actuator 31. In this way, the actuator 31 influences the opening temperature of the valve 30 according to the charge pressure.

The combination valve 30 may include a first connection 21 for the first coolant line 11, a second connection 22 for the second coolant line 12, and a third connection 23 for the third coolant line 13. The combination valve may include an expansion element 24, which may mimic a temperature sensor. The expansion element 24 detects the temperature of the coolant which comes from the internal combustion engine 3. The expansion element 24 may include wax as an expansion material in a housing. A significant change in volume of the wax occurs in the range of approximately 85-95° C. due to a phase transition. The change in volume, along with pressure from the charge air, is converted into a movement of a transmission pin 25, whereby the respective opening status of the second connection 22 and of the third connection 23 are controlled. Cooling again of the wax results in the transmission pin 25 being pushed back into its starting position, for example by a spring mechanism 26.

Vehicle 300 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, engine coolant temperature sensors, and composition sensors may be coupled to various locations in the vehicle system 106. As another example, the actuators may include a delaying element 50, as described below.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

Turning now to FIG. 4, it illustrates the dependence of the opening state of the connection 22 on the temperature of the coolant and the charge pressure. Here, the opening characteristic at low charge pressure is illustrated by the solid line, and the opening characteristic at high charge pressure is illustrated by the dashed line. At low charge pressure, the valve opening begins at 90° C. and is complete at 95% with a valve opening of 50%. At the same time, the valve of the connection 23 is closed at the same rate, so that the closure begins at 90° C. and is complete at 95° C.

At high charge pressure, the valve opening of the connection 22 begins at 85° C. At 90%, the valve opening is 50%, and at 95° C., the valve opening is 100%. The valve of the connection 23 begins to close at 85° C. and is closed off at 90° C.

Reduction in the temperature of the coolant and/or in the charge pressure results in the valves of the connections 22 and 23 moving back again accordingly. This movement and the holding in the starting position (0 mm stroke position of the transmission pin and thus 0% opening of the connection 22) are assisted by the action of the spring mechanism 26.

The function of the combination valve 30 according to the disclosure can be described on the basis of various working states of the combination valve 30 as per FIGS. 5-10. In a first working position shown in FIG. 5, the temperature of the coolant is below 85° C. In this case, the expansion element 24 has its smallest extent. At the same time, a low charge pressure prevails in the intake tract 4, with the result that the actuator 31 is not activated. The second connection 22 is closed, and the third connection 23 is open. Consequently, the coolant coming from the internal combustion engine 3 flows into the third coolant line 13, that is to say through the bypass line of the heat exchanger 4.

In a second working position shown in FIG. 6, the temperature of the coolant is 90° C. and is thus slightly elevated. The expansion element 24 begins to expand due to the phase transition of the wax contained therein and, in this way, moves the transmission pin 25, although not to an extent sufficient to close the connection 23 and to open the connection 22. A low charge pressure prevails in the intake tract, with the result that the actuator 31 is not activated. The second connection 22 is closed, and the third connection 23 is open. Consequently, the coolant coming from the internal combustion engine 3 flows into the third coolant line 13, that is to say through the bypass line of the heat exchanger 4.

In a third working position shown in FIG. 7, the temperature of the coolant is 95° C. and is thus relatively high. In one example, a high coolant temperature is greater than an upper temperature of a range at which the expansion element 24 phase changes. The expansion element 24 has attained its maximum volume. The charge pressure is still low. In this setting, the transmission pin 25 has been moved by way of the action of the expansion element 24 in such a way that the second connection is 50% open and the third connection 23 is closed. Consequently, the coolant coming from the internal combustion engine 3 flows into the second coolant line 12, that is to say to the heat exchanger 4 at a first flow rate.

In a fourth working position shown in FIG. 8, the temperature of the coolant is below 85° C., wherein the charge pressure is high. The expansion element 24 has its smallest volume. The actuator 31 is in a state activated by the charge pressure and acts on the transmission pin 25, although the action is not sufficient to open the second connection 22. The second connection 22 is thus closed, and the third connection 23 is open. Consequently, the coolant coming from the internal combustion engine 3 flows into the third coolant line 13, that is to say through the bypass line of the heat exchanger 4. In one example, the fourth working position may be similar to the second working position of FIG. 6.

In a fifth working position as shown in FIG. 9, the temperature of the coolant is 90° C., wherein the charge pressure is high. The expansion element 24 begins to expand due to the phase transition of the wax contained therein and, in this way, acts on the transmission pin 25. The actuator 31 is in a state activated by the elevated charge pressure and acts on the transmission pin 25, which, by way of the joint action of the expansion element 24 and the actuator 31, is moved in such a way that the second connection 22 is opened 50% and the third connection 23 is closed. Consequently, the coolant coming from the internal combustion engine 3 flows into the second coolant line 12, that is to say to the heat exchanger 4. In one example, the fifth working position is similar to the third working position of FIG. 7.

In a sixth working position as shown in FIG. 10, the temperature of the coolant is 95° C. and is thus high. The expansion element 24 has attained its maximum extent and thus acts on the transmission pin 25. The charge pressure is high. The actuator 31 is in a state activated by the elevated charge pressure and acts on the transmission pin 25, which, by way of the joint action of the expansion element 24 and the actuator 31, is moved in such a way that the second connection 22 is opened 100% and the third connection 23 is closed. Consequently, the coolant coming from the internal combustion engine 3 flows into the second coolant line 12, that is to say to the heat exchanger 4, specifically with an increased flow in comparison with a 50% open connection. In this way, in the case of a high charge pressure and high coolant temperature, provision is made for a faster flow of the coolant for ensuring efficient cooling of the internal combustion engine 3.

In a further embodiment, the combination valve 30 may also include an additional element which delays the movement of the transmission pin 25 and thus the opening and closing of the connections 22, 23. Thus, even after reduction of the charge pressure, for a certain period of time, faster flowing of coolant to the heat exchanger 4 is still possible if the internal combustion engine 3 still has elevated temperatures. The delaying element 50 may include a throttle in the feed line 40 to the actuator 31 or else directly at the actuator 31, which throttle point delays the transmission of the charge pressure into and out of the actuator. Through corresponding design of the throttle, it is thus possible for a targeted temporal delay to be achieved. A throttle with a type of "valve function" that differently delays the flow of the charge air into or out of the actuator is also possible. In this way, a short reaction time could be achieved in the case of a jump from low load to high load.

In one example, the combination valve 30 may be configured to adjust a coolant flow to the heat exchanger 4 via a combination of the coolant temperature and a charge pressure. As described above, charge pressure is defined as a pressure of air in the intake tract downstream of a compressor relative to a direction of intake air flow. The connecting line 40 extends from a region between the compressor 9 and the engine 3 to the actuator 31. The actuator 31 is configured to react to differences in pressure and, in the case of elevated pressure, to effect a movement of the transmission pin 25.

The combination valve 30 may be configured such that during conditions where only one of the temperature of the coolant is greater than an upper threshold temperature or the pressure is greater than an upper threshold pressure, the transmission pin 25 is only partially moved such that a flow rate through the second coolant line 12 is less than a highest flow rate. The upper threshold temperature may be equal to a non-zero, positive number. In one example, the upper threshold temperature is equal to a temperature greater than a highest temperature of a phase-change temperature range of the expansion element 24. The upper threshold pressure may be equal to a non-zero, positive number, wherein the upper threshold pressure may be based on a biasing force of the spring mechanism 26.

When the coolant temperature is less than a lower threshold temperature, which is based on a lowest temperature of the phase-change temperature range, and a charge pressure is less than a lower threshold pressure, then the transmission pin 25 may be in the first working position. The spring mechanism 26 forces the transmission pin 25 to seal the second connection 22 and block coolant flow to the second coolant line 12. As such, all coolant in the combination valve 30 flows through the third connection 23 to the third coolant line 13, wherein the coolant may bypass the heat exchanger 4. In the first working position, coolant may not be in thermal communication with the heat exchanger 4.

During conditions where the coolant temperature is between the lower threshold temperature and the upper threshold temperature and the charge pressure is less than the lower threshold pressure, then the transmission pin 25 may be moved to a second working position via only the expansion element 24 partially expanding. In the second working position, the second connection 22 is sealed and the third connection 23 is less open compared to the first working position. As such, a coolant flow rate to the third coolant line 13 may be lower than the coolant flow rate to the third coolant line 13 of the first working position.

When the coolant temperature is greater than the upper threshold temperature and the charge pressure is less than the lower threshold pressure, then the transmission pin 25 is moved to a third working position. The expansion element 24 may be fully phased changed, which may result in the second connection 22 being partially opened and the third connection 23 being fully sealed. In this way, the expansion material 24 may not be configured to fully actuate the transmission pin 25 independently.

Conversely, if the coolant temperature is less than the lower threshold temperature and the charge pressure is greater than the upper threshold pressure, then a fourth working position is reached. In the fourth working position, the second connection 22 is sealed and the third connection 23 is partially open. Thus, even though the charge pressure is greater than the upper threshold pressure, cooling of the coolant is not desired due to its temperature being less than the lower threshold temperature, and coolant only flows through the third coolant line 13 and bypasses the heat exchanger 4. In this way, overcooling of the coolant in response to the charge pressure does not occur.

If both the coolant temperature and the charge pressure are greater than respective upper thresholds, then the transmission pin 25 may be moved to the sixth working position and the third connection 23 is fully sealed. Furthermore, the second connection 22 may be fully opened, such that a highest coolant flow rate may be achieved through the second coolant line 12 to the heat exchanger 4. In this way, the coolant temperature may be reduced quickly. If the charge pressure begins to decrease below the upper threshold pressure and the coolant temperature is still above the upper threshold temperature while the combination valve 30 is in the sixth working position, then a throttle or other In one example, the thermostat valve may further include a fifth working position. In one example, the fifth working position may be a fixed position. As another example, the fifth working position may be a variable position wherein the coolant flow through the second connection 22, through the second coolant line 12, and to the heat exchanger 4. The flow rate of coolant through the second connection 22 may be varied in response to the coolant temperature. In one example, the coolant temperature may be between the lower and upper threshold temperatures. If the coolant temperature is closer to the lower threshold temperature, then the flow rate may be relatively low, resulting in less cooling of the coolant. If the coolant temperature is closer to the upper threshold temperature, then the flow rate may be relatively high, while being less than the flow rate of the sixth working position, resulting in more cooling of the coolant. In this way, the fifth working position of the thermostat valve may be configured to provide varied cooling of the coolant by adjusting the lift of the transmission pin 25 in response to the coolant temperature.

FIGS. 1, 3, and 5-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 11, it shows a method 1100 for adjusting operation of the delaying element and/or the thermostat valve in response to a coolant temperature and a charge pressure. Instructions for carrying out method 1100 may be executed by a controller based on instructions stored on a memory of the controller and in conjunction with signals received from sensors of the engine system, such as the sensors described above with reference to FIG. 3. The controller may employ engine actuators of the engine system to adjust engine operation, according to the method described below.

At 1102, the method 1100 includes determining a coolant temperature. The coolant temperature may be directly measured via one or more temperature sensors arranged along a coolant line, in a coolant jacket of an engine, or other area in contact with coolant. Additionally or alternatively, the coolant temperature may be estimated based on one or more engine operating conditions, including but not limited to an engine load, a manifold vacuum, a throttle position, an engine speed, and an air/fuel ratio.

At 1104, the method 1100 may include determining a charge pressure. The charge pressure may be determined via a pressure sensor, an exhaust gas sensor, a compressor speed, a turbine speed, or the like. Additionally or alternatively, the charge pressure may be estimated based on an engine speed, manifold vacuum, and the like.

At 1106, the method 1100 may include determining if a charge pressure is greater than an upper threshold pressure. In one example, the upper threshold pressure is based on a non-zero, positive number. The upper threshold pressure may be equal to a high charge pressure. The high charge pressure may occur during a high load, a transient condition, and the like. In one example, a compressor speed is relatively high when the charge pressure is high.

If the charge pressure is not greater than the upper threshold, then at 1108, the method includes determining if a coolant temperature is less than a lower threshold temperature. The lower threshold temperature may be equal to a lowest temperature of a phase-change temperature range of a phase-change material of the expansion element of the thermostat valve.

If the coolant temperature is less than the lower threshold temperature and the charge pressure is less than the upper threshold temperature, then cooling of the coolant may not be desired and at 1110, the method includes sealing the second connection and opening the third connection.

At 1112, the method includes flowing coolant through the bypass. As such, coolant does not flow through the heat exchanger and a temperature of the coolant may not be reduced.

If the coolant temperature is not less than the lower threshold temperature, then at 1114, the method may include partially opening the second connection and sealing the third connection.

At 1116, the method may include flowing coolant to the heat exchanger at a lower flow rate. In one example, the second connection may be opened to up to 50% of a fully open position based on the coolant temperature. For example, if the coolant temperature is greater than an upper threshold temperature, then the second connection is opened to 50% of the fully open position and coolant flow to the heat exchanger is achieved. If the coolant temperature is less than the upper threshold temperature and greater than the lower threshold temperature, then the second connection may be opened to between 0 to 50% of the fully open position. In this way, the coolant flow to the heat exchanger may vary in response to the coolant temperature. By doing this, the coolant temperature may be fine-tuned without the use of electronic actuators.

Returning to 1106, if the charge pressure is greater than the upper threshold pressure, then at 1118, the method may include determining if the coolant temperature is greater than the upper threshold temperature. The upper threshold temperature is based on a non-zero, positive number equal to a highest temperature of the phase-change temperature range of the expansion element of the thermostat valve.

If the coolant temperature is not greater than the upper threshold temperature, then at 1120, the method includes determining if the coolant temperature is less than the lower threshold temperature, similar to 1108 described above.

If the coolant temperature is less than the lower threshold temperature, then at 1122, the method may include fully opening the third connection and sealing the second connection.

At 1124, the method may include flowing coolant through the bypass. As such, the coolant may not flow through the heat exchanger.

If the coolant temperature is greater than the lower threshold temperature at 1120, then at 1126, the method may include sealing the third connection.

At 1128, the method may include adjusting an opening of the second connection. In one example, a magnitude of the opening of the second connection may be based on the temperature of the coolant. For example, if the coolant temperature is closer to the upper threshold temperature than the lower threshold temperature, then the second connection may be more open and a higher flow rate of coolant may flow to the heat exchanger. As another example, if the coolant temperature is closer to the lower threshold temperature than the upper threshold temperature, then the second connection may be more closed and a lower flow rate of coolant may flow to the heat exchanger. In this way, the flow rate of coolant to the heat exchanger may be controlled by the coolant temperature when the charge pressure is high (e.g., above the upper threshold pressure).

Returning to 1118, if the coolant temperature is greater than the upper threshold temperature, then at 1130, the method may include fully opening the second connection and sealing the third connection.

At 1132, the method may include flowing coolant to the heat exchanger at a higher flow rate compared to the flow rates at 1116 and 1128. In one example, the second connection is fully open and the higher flow rate is a maximum flow rate to the heat exchanger. In this way, the coolant temperature may be decreased quickly.

At 1134, the method may include determining if the charge pressure decreases to less than the lower threshold while the coolant temperature is still above the upper threshold temperature. This may occur during a shift from a high load to a low load, end of a transient condition, or the like.

If the charge pressure falls below the lower threshold pressure while the coolant temperature is still above the upper threshold temperature, then at 1136, the method may include activating a delaying element until the coolant temperature falls below the upper threshold temperature. In one example, activating the delaying element may include a controller signaling to the delaying element to seal a connecting line from a pressure actuator of the combination valve 30. In one example, the delaying element is a throttle, wherein the controller actuates the throttle to a fully closed position, thereby sealing higher pressure charge gases in a thermostat valve side of the connecting line so that the second connection remains fully open. By doing this, cooling of the coolant may continue until the coolant temperature falls below the upper threshold temperature.

In one example, the valve may be adjusted passively without signals from the controller. For example, the transmission pin is adjusted in response to expansion of the expansion element based on a coolant temperature and a pressure of charge air in a pressure-based actuator. The controller may be used to actively control the delaying element during certain conditions to extend a desired operating state even when conditions are not met. For example, the sixth working position may be achieved passively based on coolant temperatures and charge pressures actuating the transmission pin to fully open the second connection. If the conditions shift such that the charge pressure decreases and the coolant temperature remains high, then the controller may signal to an actuator of the delaying element to seal the pressure-based actuator from the intake, thereby intrusively extending the sixth working position even after the charge pressure has decreased. This may provide further cooling to the coolant.

An embodiment of a system, comprises a valve configured to adjust a flow of a fluid in a coolant circuit of an engine, the valve comprising an expansion element coupled to a transmission pin to adjust the flow of the fluid through the valve based on a temperature of the fluid, wherein the transmission pin is further coupled to a pressure-regulated actuator, the transmission pin actuated based on a charge pressure at the pressure-regulated actuator. A first example of the system further includes where the pressure-regulated actuator is coupled to a variable pressure region via a connecting line. A second example of the system, optionally including the first example, further includes where the expansion element comprises wax. A third example of the system, optionally including one or more of the previous examples, further includes where the valve includes a first connection, a second connection, and a third connection, wherein the first connection is an inlet for admitting fluid into the valve, wherein the second connection and the third connection are outlets configured to expel fluid out of the valve. A fourth example of the system, optionally including one or more of the previous examples, further includes where an opening of the second connection and the third connection are based on a combination of the temperature of the fluid and the charge pressure at the pressure-regulated actuator. A fifth example of the system, optionally including one or more of the previous examples, further includes where a delaying element configured to delay a pressure-drop of the pressure-regulated actuator in response to the temperature of the fluid being greater than an upper threshold temperature. A sixth example of the system, optionally including one or more of the previous examples, further includes where the valve comprising a first working position, a second working position, a third working position, a fourth working position, a fifth working position, and a sixth working position.

An embodiment of a valve for a coolant circuit, comprises a first connection for admitting fluid to the valve, a second connection for expelling fluid from the valve to a heat exchanger, a third connection for expelling fluid from the valve to a bypass, a transmission pin configured to adjust an opening size of the second connection and the third connection, an expansion element coupled to the transmission pin and configured to adjust a position of the transmission pin in response to a fluid temperature, and an actuator coupled to the transmission pin and configured to adjust the position of the transmission pin in response to a charge pressure. A first example of the valve further includes where the transmission pin is adjusted to a first working position in response to the fluid temperature being less than a lower threshold temperature and the charge pressure being less than a lower threshold pressure, wherein the lower threshold temperature is based on a lowest temperature of a phase-change temperature range of the expansion element, and wherein the lower threshold pressure is based on a pressure at low loads, and wherein the first working position includes where the second connection is sealed and the third connection is open. A second example of the valve, optionally including the first example, further includes where the transmission pin is adjusted to a second working position in response to the fluid temperature being greater than the lower threshold temperature and less than an upper threshold temperature, and wherein the charge pressure is less than the lower threshold pressure, wherein the upper threshold temperature is based on a highest temperature of the phase-change temperature range of the expansion element, and wherein the second working position comprises where the second connection is sealed and the third connection is open. A third example of the valve, optionally including one or more of the previous examples, further includes where the transmission pin is adjusted to a third working position in response to the fluid temperature being greater than the upper threshold temperature and the charge pressure being less than the lower threshold pressure, wherein the third working position comprises where the second connection is partially open and the third connection is sealed. A fourth example of the valve, optionally including one or more of the previous examples, further includes where the transmission pin is adjusted to a fourth working position in response to the fluid temperature being lower than the lower threshold temperature and the charge pressure being greater than an upper threshold pressure, wherein the upper threshold pressure is based on the pressure at high loads, wherein the fourth working position comprises where the second connection is sealed and the third connection is open. A fifth example of the valve, optionally including one or more of the previous examples, further includes where the transmission pin is adjusted to a fifth working position in response to the fluid temperature being between the lower threshold temperature and the upper threshold temperature and the charge pressure being greater than the upper threshold pressure, wherein the fifth working position comprises where the third connection is sealed and the second connection is partially open, wherein a magnitude of an opening of the second connection is proportional to the fluid temperature. A sixth example of the valve, optionally including one or more of the previous examples, further includes where the transmission pin is adjusted to a sixth working position in response to the fluid temperature being greater than the upper threshold temperature and the charge pressure being greater than the upper threshold pressure, wherein the sixth working position comprises where the second connection is fully open and the third connection is sealed. A seventh example of the valve, optionally including one or more of the previous examples, further includes a delaying element arranged between the actuator and a region of an intake passage between a compressor and an engine, wherein the delaying element is configured to seal the actuator from the region in response to the charge pressure decreasing to a pressure less than the upper threshold pressure and the fluid temperature being greater than the upper threshold pressure when the transmission pin is in the sixth working position.

An example of a vehicle, comprises an engine, a compressor, a coolant circuit fluidly coupled to the engine, the coolant circuit comprising a heat exchanger and a bypass, and a valve arranged in the coolant circuit, the valve comprising a first connection configured to receive coolant from the cooling circuit downstream of the engine, a second connection configured to expel coolant from the valve to the heat exchanger, and a third connection configured to expel coolant from the valve to the bypass, the valve further comprising a transmission pin coupled to an expansion element and an actuator, wherein the expansion element is configured to adjust a position of the transmission pin in response to a coolant temperature and the actuator is configured to adjust the position of the transmission pin in response to a charge pressure. A first example of the vehicle further includes where the actuator is coupled to a region between the compressor and the engine. A second example of the vehicle, optionally including the first example, further includes where an opening of the second connection is variable in response to the charge pressure being above an upper threshold pressure and the coolant temperature being between a lower threshold temperature and an upper threshold temperature, wherein the lower threshold temperature and upper threshold temperature are based on extreme ends of a phase-change temperature range of the expansion element. A third example of the vehicle, optionally including one or more of the previous examples, further includes where the second connection is only partially open in response to the coolant temperature being above the upper threshold temperature and the charge pressure being below a lower threshold pressure. A third example of the vehicle, optionally including one or more of the previous examples, further includes where the second connection is fully open in response to the charge pressure being above the upper threshold pressure and the coolant temperature being above the upper coolant temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a valve configured to adjust a flow of a fluid in a coolant circuit of an engine, the valve comprising an expansion element coupled to a transmission pin to adjust the flow of the fluid through the valve based on a temperature of the fluid, wherein the transmission pin is further coupled to a pressure-regulated actuator, the transmission pin actuated based on a charge pressure at the pressure-regulated actuator.

2. The system of claim 1, wherein the pressure-regulated actuator is coupled to a variable pressure region via a connecting line.

3. The system of claim 1, wherein the expansion element comprises wax.

4. The system of claim 1, wherein the valve includes a first connection, a second connection, and a third connection, wherein the first connection is an inlet for admitting fluid into the valve, wherein the second connection and the third connection are outlets configured to expel fluid out of the valve.

5. The system of claim 4, wherein an opening of the second connection and the third connection are based on a combination of the temperature of the fluid and the charge pressure at the pressure-regulated actuator.

6. The system of claim 1, further comprising a delaying element configured to delay a pressure-drop of the pressure-regulated actuator in response to the temperature of the fluid being greater than an upper threshold temperature.

7. The system of claim 1, wherein the valve comprising a first working position, a second working position, a third working position, a fourth working position, a fifth working position, and a sixth working position.

8. A valve for a coolant circuit, comprising:
a first connection for admitting fluid to the valve;
a second connection for expelling fluid from the valve to a heat exchanger;
a third connection for expelling fluid from the valve to a bypass;
a transmission pin configured to adjust an opening size of the second connection and the third connection;
an expansion element coupled to the transmission pin and configured to adjust a position of the transmission pin in response to a fluid temperature; and
an actuator coupled to the transmission pin and configured to adjust the position of the transmission pin in response to a charge pressure.

9. The valve of claim 8, wherein the transmission pin is adjusted to a first working position in response to the fluid temperature being less than a lower threshold temperature and the charge pressure being less than a lower threshold pressure, wherein the lower threshold temperature is based on a lowest temperature of a phase-change temperature range of the expansion element, and wherein the lower threshold pressure is based on a pressure at low loads, and wherein the first working position includes where the second connection is sealed and the third connection is open.

10. The valve of claim 9, wherein the transmission pin is adjusted to a second working position in response to the fluid temperature being greater than the lower threshold temperature and less than an upper threshold temperature, and wherein the charge pressure is less than the lower threshold pressure, wherein the upper threshold temperature is based on a highest temperature of the phase-change temperature range of the expansion element, and wherein the second working position comprises where the second connection is sealed and the third connection is open.

11. The valve of claim 10, wherein the transmission pin is adjusted to a third working position in response to the fluid temperature being greater than the upper threshold temperature and the charge pressure being less than the lower threshold pressure, wherein the third working position comprises where the second connection is partially open and the third connection is sealed.

12. The valve of claim 11, wherein the transmission pin is adjusted to a fourth working position in response to the fluid temperature being lower than the lower threshold temperature and the charge pressure being greater than an upper threshold pressure, wherein the upper threshold pressure is based on the pressure at high loads, wherein the fourth working position comprises where the second connection is sealed and the third connection is open.

13. The valve of claim 12, wherein the transmission pin is adjusted to a fifth working position in response to the fluid temperature being between the lower threshold temperature and the upper threshold temperature and the charge pressure being greater than the upper threshold pressure, wherein the fifth working position comprises where the third connection is sealed and the second connection is partially open, wherein a magnitude of an opening of the second connection is proportional to the fluid temperature.

14. The valve of claim 13, wherein the transmission pin is adjusted to a sixth working position in response to the fluid temperature being greater than the upper threshold temperature and the charge pressure being greater than the upper threshold pressure, wherein the sixth working position comprises where the second connection is fully open and the third connection is sealed.

15. The valve of claim 14, further comprising a delaying element arranged between the actuator and a region of an intake passage between a compressor and an engine, wherein the delaying element is configured to seal the actuator from the region in response to the charge pressure decreasing to a pressure less than the upper threshold pressure and the fluid temperature being greater than the upper threshold pressure when the transmission pin is in the sixth working position.

16. A vehicle, comprising:
an engine;
a compressor;
a coolant circuit fluidly coupled to the engine, the coolant circuit comprising a heat exchanger and a bypass; and
a valve arranged in the coolant circuit, the valve comprising a first connection configured to receive coolant from the cooling circuit downstream of the engine, a second connection configured to expel coolant from the valve to the heat exchanger, and a third connection configured to expel coolant from the valve to the bypass;
the valve further comprising a transmission pin coupled to an expansion element and an actuator, wherein the expansion element is configured to adjust a position of the transmission pin in response to a coolant temperature and the actuator is configured to adjust the position of the transmission pin in response to a charge pressure.

17. The vehicle of claim 16, wherein the actuator is coupled to a region between the compressor and the engine.

18. The vehicle of claim 16, wherein an opening of the second connection is variable in response to the charge pressure being above an upper threshold pressure and the coolant temperature being between a lower threshold temperature and an upper threshold temperature, wherein the lower threshold temperature and upper threshold temperature are based on extreme ends of a phase-change temperature range of the expansion element.

19. The vehicle of claim 18, wherein the second connection is only partially open in response to the coolant temperature being above the upper threshold temperature and the charge pressure being below a lower threshold pressure.

20. The vehicle of claim 18, wherein the second connection is fully open in response to the charge pressure being above the upper threshold pressure and the coolant temperature being above the upper coolant temperature.

* * * * *